Dec. 12, 1933.  B. BRONSON  1,939,604

STEP PAD

Original Filed Aug. 2, 1928

INVENTOR
Budd Bronson
BY
Kerr Hudson & Kent
ATTORNEYS

Patented Dec. 12, 1933

1,939,604

UNITED STATES PATENT OFFICE 1,939,604

STEP PAD

Budd Bronson, Cleveland, Ohio, assignor to The Ohio Rubber Company, Cleveland, Ohio, a corporation of Ohio Application August 2, 1928, Serial No. 296,935
Renewed July 2, 1932

9 Claims. (Cl. 280—163)

This invention relates to a step pad and more particularly to a step pad adapted to be secured to the fender of an automobile to provide access to the rumble seat thereof.

An object of the invention is to provide a step pad which is so constructed as to possess the necessary strength and rigidity, particularly adjacent the peripheral edges thereof, and which at the same time is of simple design and neat appearance.

Another object is to provide a step pad so constructed that a peripheral seal will be formed between the pad and the fender to which it is attached to thereby prevent moisture from seeping between the pad and the fender and thus prevent excessive rusting of the pad and the fender.

A further object is to provide a step pad which may be economically manufactured and easily secured to an automobile fender.

Additional objects and advantages will appear hereinafter as a description of a preferred embodiment of the invention proceeds.

In the accompanying drawing illustrating such preferred embodiment:

Figure 1:
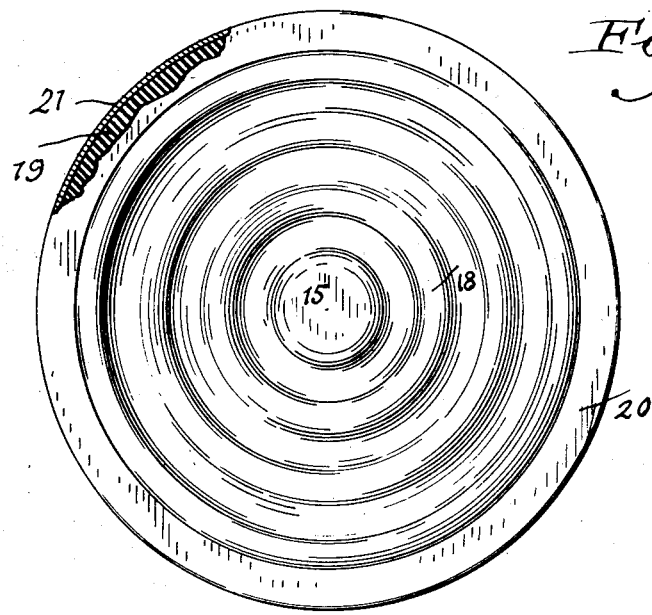
Figure 1 is a top plan view of the step pad, a portion of the peripheral trim of the pad being broken away.
Figure 2:
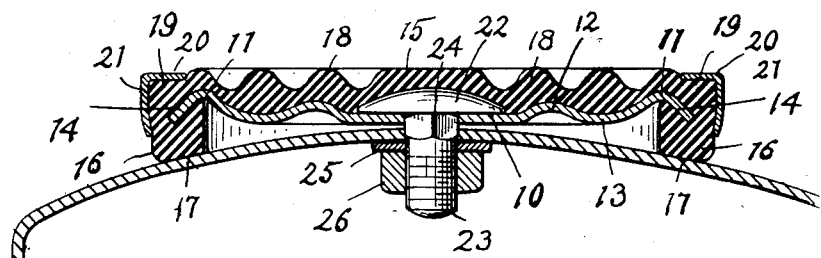
Fig. 2 is a transverse vertical section through the pad and an automobile fender showing the relationship between the pad and the fender when the former is secured in position upon the latter.
Figure 3:
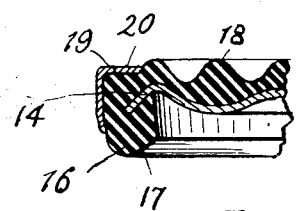
Fig. 3 is a fragmentary transverse vertical section through the step pad before the same is secured to an automobile fender.

Broadly, the step pad comprises three main elements, namely, a metal insert or reinforcing member having associated therewith a securing means, a rubber pad adapted to be molded on and around the insert, and a peripheral metal trim or ferrule adapted to be secured upon the periphery of the rubber pad. The metal insert or reinforcing member may be of any desired configuration as for example, it may be substantially annular in shape, as shown herein, and is provided at its center with a plane portion 10 and at its periphery with an upstanding peripheral bead 11. The upstanding peripheral bead 11 provides a strengthening reinforcement adjacent the edges of the step pad so that the pad will be able to withstand and support the weight of a person stepping upon the edges thereof. However, in order to additionally strengthen the metal insert or reinforcing member, the same may be provided with a series of reinforcing corrugations intermediate the peripheral bead 11 and the plane central portion 10, such intermediate reinforcing corrugations having the crest of the corrugations indicated at 12 in the drawing and the trough at 13. It should be understood that although the metal insert is illustrated herein as having a single corrugation crest and a single corrugation trough intermediate the central portion and the peripheral bead, that the number might be readily varied according to the size of the step pad to be used and also according to the degree of curvature of the corrugation waves. The outer edge of the peripheral bead 11 is extended angularly downwardly and outwardly a substantial distance, indicated at 14, it being desirable that it extend at least as far as the projected plane of the under side of the plane central portion of the insert although, of course, this is not actually necessary.

It might be here noted that the under side of the trough portions 13 also lie in the plane of the under side of the plane portion 10 and that the upper side of the peripheral bead 11 is located above the upper side of the crest portions 12 of the corrugations. This arrangement results in the metal insert being somewhat dished or cup-shaped in its general cross section, thereby greatly increasing the strength of the same.

The rubber pad is adapted to be molded on and around the insert and to this end is formed with a main body portion indicated generally at 15 which rests upon the upper surface of the insert and a peripheral depending flange portion 16 which surrounds and embeds the angular extension 14 of the peripheral bead. The depending flange portion 16 extends a substantial distance below the plane of the under side of the plane portion 10 of the insert for a purpose later to be made apparent, which distance will vary somewhat in accordance with the transverse radius of the fender to which the pad is to be secured. The under or bottom side 17 of the flange 16 is shaped to conform approximately with the transverse radius of the fender so that a tight engagement may be effected between the pad and the fender when the same is secured thereto as will be more fully set forth hereinafter.

The upper surface of the rubber pad is provided with a number of corrugations 18 to prevent a person slipping when stepping upon the step pad, such corrugations, however, not extending entirely to the periphery of the rubber pad but allowing for a plane portion 19 at the upper or top side of the flange 16 whereby the inwardly extending flange 20 of an annular metal trim or ferrule 21 may have a flush seating engagement with the rubber pad.

The downwardly extending flange of the ferrule or trim 21 is disposed adjacent the outer side of the flange 16 of the rubber pad but does not extend the full length of the flange. It should be noted here that the outer side of the flange 16 of the pad is curved slightly inwardly to enable the metal trim or ferrule after it has been slipped upon the pad to be crimped into engagement with the pad. The metal trim or ferrule is not crimped abruptly into engagement with the pad but is crimped with a gradual curve into such engagement, the crimping process being carried out by means of a punch press or other suitable machine.

As already broadly intimated, there is a securing means associated with the metal insert for the purpose of enabling the step pad to be secured to an automobile fender which securing means may be formed either integrally with the insert or may be a separate stud or bolt having its shank passing through an opening in the insert at the center thereof while its head bears upon the upper side of the central portion 10. It is this latter form of securing means that is shown in the drawings, such means including, the head portion 22, the threaded shank portion 23 and a squared portion 24 adapted to fit within the opening in the insert and to prevent turning of the securing means therein.

In assembling the elements of the pad together, the securing means, if such means is a separate element, is passed through the central opening in the insert with the head 22 thereof arranged upon the upper side of the central plane portion 10. The rubber pad is then molded on and around the insert so that the main central corrugated portion of the pad covers the upper surface of the insert while the flanges 16 thereof embed the extension 14 of the peripheral bead 11 of the insert. This molding of the rubber to the insert also securely fastens the securing means in position since the rubber pad is likewise molded to the head 22 thereof. The metal trim or ferrule 21 is then slipped into position upon the pad and is crimped in place as previously described.

In mounting the assembled step pad upon an automobile fender, the latter is provided with an opening suitably arranged at the crest of the transverse curvature of the fender and in the proper position for convenient use of the step, such opening preferably being adapted to receive the squared portion 24 of the securing means so that when the pad is finally positioned there will be no liability of the same turning upon the fender. The pad is now positioned upon the fender with the securing means inserted through the opening formed therein. A suitable washer 25, preferably a lock washer, is slipped over the threaded end of the shank of the securing means and a nut 26 screwed upon such end until the step pad is tightened down upon the fender in its finally secured position.

When in this position, the under or bottom side of the flange 16 of the rubber pad will be in engagement with the fender and will be tightly compressed by such engagement. As already set forth, the configuration of the under or bottom side of the flange 16 approximates the transverse curvature of the fender whereby there will be an engagement between the flange and the fender substantially throughout the width of the flange. The construction of the step pad is such that when it has been finally positioned and secured upon the fender there will be only a metal-to-rubber engagement between the pad and the fender since the central plane portion of the metal insert will be located with a slight clearance above the fender. The engagement between the flange 16 of the rubber pad and the fender provides a water-tight peripheral seal between the step pad and the fender thereby fully eliminating the possibility of moisture seeping in between the step pad and the fender and thus causing excessive rusting of the metal insert and of that portion of the fender beneath the pad.

Although a preferred embodiment of the invention has been shown and described, it should be understood that the same is not to be limited thereto but is susceptible of such modifications and adaptations as fall within the scope of the appended claims.

I claim:

1. A step pad adapted to be used upon the fender of an automobile comprising a metal insert having an upwardly extending peripheral bead, a rubber pad of substantially the same general configuration as the insert and having a downwardly extending peripheral flange, said pad being molded upon and around said insert with a portion of the peripheral bead of the insert embedded in the peripheral flange of the pad, and means associated with said insert for securing the step pad in position upon the automobile fender.

2. A step pad adapted to be used upon the fender of an automobile comprising a metal insert having an upwardly extending peripheral bead, a rubber pad of substantially the same general configuration as that of the insert having a downwardly extending peripheral flange, the bottom edge of which is shaped to conform substantially with the transverse radius of the fender to which the step pad is to be attached, said rubber pad being molded upon and around said insert with a portion of the peripheral bead of the insert embedded in the peripheral flange of the pad, and means associated with said insert for securing the step pad in position.

3. A step pad adapted to be used upon the fender of an automobile comprising a metal insert having an upwardly extending peripheral bead, the outer side of which extends a substantial distance downwardly and outwardly, a rubber pad of substantially the same general configuration as that of the insert having a downwardly extending peripheral flange, the bottom edge of which is shaped to conform substantially with the transverse radius of the fender, said pad being molded upon and around said insert with the outer side of the peripheral bead of the insert embedded in the peripheral flange of the pad, and means associated with said insert for securing the step pad in position.

4. A step pad adapted to be used upon the fender of an automobile comprising a metal insert having an upwardly extending peripheral bead, the outer side of which extends angularly downwardly and outwardly to substantially the plane of the under side of the center of the insert, a rubber pad having a peripheral flange extending downwardly below the plane of the under side of the center of the insert, said rubber pad being molded upon and around said insert with the outer side of the peripheral bead thereof embedded in the flange of the pad, and means associated with said insert for securing the step pad in position upon the automobile fender whereby the bottom edge of said flange will be compressed against the fender and form a water-tight seal.

5. A step pad adapted to be used on the fender of an automobile comprising a metal insert having an upwardly extending peripheral bead, the outer side of which extends angularly downwardly and outwardly to substantially the plane of the center of the insert, a rubber pad having a peripheral flange extending downwardly below the plane of the center of the insert and having its bottom edge shaped to conform substantially with the transverse radius of the fender, said rubber pad being molded upon and around said insert with the peripheral bead thereof embedded in the peripheral flange of the pad, and means associated with said insert for securing the step pad in position upon the fender whereby the bottom edge of the pad will be compressed against the fender and form a water-tight seal.

6. A step pad adapted to be used upon the fender of an automobile comprising a metal insert having a plane central portion and a corrugated portion adjacent the periphery thereof, a rubber pad of substantially the same general configuration as the insert having a peripheral flange extending downwardly therefrom, said pad being molded upon said insert and embedding a portion thereof within the peripheral flange, said peripheral flange of the pad extending downwardly below the plane of the under side of the metal insert and having its bottom edge shaped to conform substantially to the transverse radius of the fender, and means associated with the plane central portion of the insert for securing the step pad to the fender.

7. A step plate comprising a metal insert having an upwardly extending peripheral bead, a rubber tread of substantially the same general configuration as the insert and having a downwardly extending peripheral flange, said tread being molded upon and around said insert with a portion of the peripheral bead of the insert embedded in the peripheral flange of the tread, and means for securing the step pad to a support.

8. A composite step plate structure comprising a sheet metal plate having a flange portion extending along a substantial portion of the peripheral edge thereof and which flange portion is deflected out of the general plane of the plate, and a rubber tread vulcanized to the top surface only of the plate and having a thickened integral edge portion extending along the edge of the plate and in which said flange portion is embedded.

9. A composite step plate structure comprising a sheet metal plate provided with a flange portion which extends along a substantial portion of the peripheral edge of the plate and which is deflected out of the general plane of the plate, and a rubber tread vulcanized to the top surface of the plate and having a thickened integral edge portion extending along the edge of the plate, said thickened edge portion being molded around the edge of said flange portion and vulcanized to the reverse side of the flange portion terminating substantially at the junction of the flange portion with the plate.

BUDD BRONSON.